United States Patent [19]
Farmer et al.

[11] Patent Number: 5,739,270
[45] Date of Patent: Apr. 14, 1998

[54] METHOD AND APPARATUS FOR SEPARATING POLYMER FROM A PLASTIC, AND THE RESULTING SEPARATED POLYMER

[76] Inventors: Peter H. Farmer, 70 Avondale Rd., Longmeadow, Mass. 01106; John M. Moses, 105 Vincent Rd., Dedham, Mass. 02026

[21] Appl. No.: 509,110

[22] Filed: Aug. 1, 1995

[51] Int. Cl.$^6$ ......................................... C08F 6/10
[52] U.S. Cl. ..................... 528/501; 521/40; 521/40.5; 528/483; 528/501; 523/332; 523/340; 523/342; 523/343
[58] Field of Search ................. 521/40, 40.5; 528/483, 528/501; 523/332, 340, 342, 343

[56] References Cited

U.S. PATENT DOCUMENTS

| | | | |
|---|---|---|---|
| 3,256,212 | 6/1966 | Grover et al. | 521/40.5 |
| 4,543,364 | 9/1985 | Nankee et al. | 521/40 |
| 4,746,422 | 5/1988 | Grimm | 209/172 |
| 4,898,673 | 2/1990 | Rice et al. | 210/634 |
| 4,929,462 | 5/1990 | Moorman et al. | 426/478 |
| 5,049,647 | 9/1991 | Al-Ghatta | 528/272 |
| 5,237,048 | 8/1993 | Miyakawa et al. | 528/483 |
| 5,306,807 | 4/1994 | Kailasam et al. | 528/483 |

FOREIGN PATENT DOCUMENTS

| | | | |
|---|---|---|---|
| 3323940 | 1/1985 | Germany | 528/483 |

OTHER PUBLICATIONS

*A Study of the Application of Supercritical Fluids in the Recycling Alkaline–Wash Process as a Novel Means for Obtaining Cleaner, Near–Virgin Recycled Plastic*, Occhiogrosso, Filpo, Lucas, prepared for presentation at the ALChe Spring National Meeting, Atlanta, Georgia, Apr. 17–21, 1994, for the *Application of Supercritical Fluids Symposium*.

*Primary Examiner*—Andrew E.C. Merriam
*Attorney, Agent, or Firm*—Brian M. Dingman

[57] ABSTRACT

A method and apparatus for continuously separating polymer from a plastic, and the resulting separated polymer. The plastic is made flowable into a stream through melting or solubilizing. A critical fluid, such as supercritical carbon dioxide, is added to the plastic stream to promote mechanical or thermodynamic separation of the polymer from contaminants and other components of the plastic.

15 Claims, 3 Drawing Sheets

5,739,270

METHOD AND APPARATUS FOR SEPARATING POLYMER FROM A PLASTIC, AND THE RESULTING SEPARATED POLYMER

FIELD OF INVENTION

This invention relates to a method and apparatus for continuously separating the polymer component of a plastic from contaminants, and other components of the plastic, to purify the polymer, and potentially other plastic components, for reuse. This invention also relates to the resulting polymer-based product.

BACKGROUND OF INVENTION

The recycling of plastics has become common. A fair amount of work has been conducted in the field of recycling polyethylene terephthalate (PET). PET is used primarily for making soft drink bottles. The use in the United States exceeds 330 tons per year. U.S. Pat. No. 4,746,422, issued on May 24, 1988, to Grimm discloses a method of separating PET chips from heavier material such as aluminum and glass that are often mixed with post-consumer soft drink bottles. The process contemplates contacting the plastic and contaminant mixture with a two-phase solution of a halogenated hydrocarbon and water, and rotating the mixture to separate the contaminants by gravitation. The heavier contaminants are carried by the halogenated hydrocarbon. The plastic and water are rejected from a different part of the separator. U.S. Pat. No. 4,543,364, issued on Sep. 24, 1985, to Nankee et al., discloses a process for separating soft drink bottle label adhesives from PET resin using chlorinated solvents which dissolve the adhesives. The processes disclosed in both of these patents thus require the use of chlorinated solvents, which are not environmentally benign. Further, the two patents discuss only the segregation of the PET resin from contaminants which are not integral with the plastic itself.

Such segregated plastic resin is often unsatisfactory for reuse. The PET from which soft drink bottles are made may contain absorbed impurities which greatly decrease the desirability of the recycled PET. U.S. Pat. No. 5,049,647, issued on Sep. 17, 1991, to Al-Ghatta, discloses a batch process for extracting impurities from recycled PET resins. That process contemplates placing the contaminated, post-consumer PET in an autoclave containing carbon dioxide ($CO_2$). The pressure and temperature in the autoclave are raised above the supercritical point of carbon dioxide. After one to five hours of treatment, the autoclave is cooled and the pressure is let down. Testing of the PET resin indicates that hydrocarbon impurities in the resin, including acetaldehyde, acetone, acetic acid, carbon tetrachloride, trichloroethane, and methyl benzoate are removed. This process has been shown to remove only some organic contaminants from the resin, thus it is suitable only for purifying the plastic. Also, such batch processing is not well suited for production recycling. Further, this process is only useful for removing hydrocarbon contaminants from PET resin. There are many other polymers which need to be to purified and reused. And, recycling may require purification of the polymer component of the plastic by way of removal of non-polymer components such as plasticizers.

One such polymer is polyvinyl butyral (PVB). PVB plastic is used as the interlayer in automobile and architectural safety glass laminates. The world consumes 100 million square meters of PVB interlayer each year. In North America alone, approximately 13 million motor vehicles are built annually. Each vehicle windshield contains approximately one to three pounds of PVB interlayer. Approximately 12 million vehicles per year are scrapped in the United States, and on top of that some six to seven million windshields are either broken or rejected by auto manufacturers each year. Accordingly, some 20 to 50 million pounds of PVB interlayer per year are found in broken or defective automobile windshields. Approximately 65% to 80% by weight of the PVB interlayer is PVB polymer—the remainder is primarily plasticizers, including dihexyl adipate, and tetraethylene glycol DI-N-heptanoate, and other proprietary components produced by Monsanto and duPont.

The process by which PVB interlayer is manufactured is complex, expensive, and requires a substantial amount of capital equipment; there are only four companies in the world which currently manufacture PVB interlayer in any significant volume. The PVB interlayer is extruded as a plasticized, optically clear, rough surfaced, extremely sticky film which is shipped in rolls in refrigerated containers to prevent the sheet from self-adhering—the interlayer glass transition temperature is only about 28° C. Glass laminators then sandwich the plastic between two pieces of very thin glass. The rate at which such laminations can be accomplished, and the quality of the safety glass product, depends in large measure on the properties of the interlayer. Accordingly, much care is taken to produce a high-quality PVB interlayer film.

Glass recyclers have begun to reuse the glass from discarded windshields. However, the millions of pounds of PVB interlayer are either landfilled or burned. Part of the reason for this is that the plasticized PVB interlayer is extremely sticky and difficult to handle. Also, the PVB interlayer left from a discarded windshield is contaminated with a fair amount of glass shards, dirt, and other particulate contaminants, making re-extrusion impractical, if not impossible. And, the glass shards are virtually impossible to remove from the plasticized PVB due to its tackiness. Accordingly, there exists a substantial need for a process for effectively recycling one or more of the components of PVB interlayer.

U.S. Pat. No. 4,929,462, issued on May 29, 1992, to Moorman et al., and U.S. Pat. No. 4,898,673, issued on Feb. 6, 1990, to Rice et al., each disclose the extraction of contaminants from food particles using a flow of supercritical $CO_2$. Special provision is made in the systems disclosed in the patents for mixing the solids at atmospheric pressure and temperature with the supercritical $CO_2$ at greatly elevated pressure and temperature. The apparatus in U.S. Pat. No. 4,898,673 is a batch-type process in which a slug of solids subdivided sufficiently to form a pumpable slurry is injected under pressure into a flowing supercritical $CO_2$ stream. The process disclosed in U.S. Pat. No. 4,929,462, requires complex equipment for pressurizing the solid particles before they are introduced into the pressure vessel wherein they are extracted with supercritical $CO_2$. There are thus constraints to the processing of solid particles with supercritical $CO_2$ flow which make it a relatively difficult and expensive process.

SUMMARY OF THE INVENTION

It is therefore an object of this invention to provide a method for extracting non-polymer components, for example plasticizers, from plastic so that the polymer can be reused.

It is a further object of this invention to provide such a method which does not require the use of polluting solvents, including flammable or chlorinated hydrocarbon solvents.

It is a further object of this invention to provide such a method which is adapted to recycle one or more components of post-consumer PVB interlayer.

It is a further object of this invention to provide such a method which can recycle the PVB polymer from discarded safety glass interlayer.

It is a further object of this invention to provide such a method which can be practiced as a high volume, continuous process well suited for commercial recycling.

It is a further object of this invention to provide such a method for more easily removing particulate contaminants from post-consumer plastic such as PVB interlayer.

It is a further object of this invention to provide such a method which can recover both the polymer and plasticizer from industrial plastic waste as well as post-consumer plastic.

This invention results from the realization that post-consumer PVB interlayer from discarded safety glass can be recycled into PVB polymer and the plasticizer or components used in the PVB interlayer manufacturing process by extruding the waste PVB interlayer into a critical working fluid in a continuous process. The critical working fluid, for example carbon dioxide, dissolves most of the plasticizers and other non-polymer components of the PVB. The extruded plastic-critical fluid mixture is extremely fluid, making particulate filtration from the stream practical in order to fully clean the plastic. The result of the process is a clean, quality PVB powder, with about 1% to 10% plasticizer. The remaining plasticizer and other components are also separated.

This invention features methods for separating a polymer such as PVB from other components of a plastic, including plasticizers, ultraviolet and oxidation stabilizers, and colorants found in windshield interlayer PVB film. The separation is accomplished with a fluid extraction solvent for the component or components to be removed from the plastic, typically the plasticizer. This solvent is termed herein the "working fluid". The working fluid preferably also plasticizes or solubilizes the polymer component of the plastic. The working fluid-plastic mixture thus typically has a lower viscosity than melted plastic, which greatly simplifies the filtration of particulate matter from the plastic, a step that is critical for accomplishing a clean recycled product. Also contemplated is the use of cosolvents for dissolving the polymer component of the plastic to facilitate particulate filtration. Alternative forms of cosolvents may dissolve the polymer only slightly, but are effective in forming a slurry or other less-viscous form of the plastic, to facilitate filtration and further processing.

In a preferred embodiment, a flow of melted plastic is provided, for example by processing the plastic through an extruder, which may operate at approximately 100 bars and 200° C. The extruder tolerance is large enough so that it is not blinded by particulate contaminants, particularly the glass shards and dirt which contaminate post-consumer safety glass interlayer. The melted plastic flow has mixed into it, or is mixed into, a flow of working fluid (typically supercritical $CO_2$), which dissolves most of the non-polymer components to purify the polymer component of the plastic. The working fluid is typically a solvent for at least one non-polymer component of the plastic. The working fluid can alternatively or additionally be a solvent for the polymer component of the plastic. The working fluid is a fluid which is a gas at room temperature. Working fluids include carbon dioxide, ethane, propane, butane, ethylene, propylene, butylene, dimethyl ether, sulfur hexafluoride, nitrous oxide, and halogenated hydrocarbons. The working fluid may be in the form of a liquid, a critical fluid, or a supercritical fluid. For purposes of this patent application, the term "critical fluid" is defined as a fluid with a temperature and/or pressure of about 0.9–1.1 times the critical temperature and pressure, respectively, of the substance. The actual working fluid for purposes of this invention can be any one or more of the above working fluids. Flammable components of mixtures of the above are preferably present in relatively low amounts so that the working fluid mixture is non-flammable.

The working fluid can then be separated from the polymer to leave behind high-quality polymer which can be reused in a plastics manufacturing process. The working fluid can then have separated from it the dissolved components for recycle of the dissolved components, and re-use of the working fluid as the solvent in a closed-loop recycle process, if desired.

Also contemplated is the use of one or more working fluid-miscible cosolvents which can be added to the working fluid before it is mingled with the plastic. The cosolvent can be a polymer solubilizer, or a solubilizer of one or more of the non-polymer components of the plastic. Cosolvents include alcohols, ketones, esters, ethers, aliphatic hydrocarbons, aromatic hydrocarbons, and hydrocarbon gases, for example. Potentially flammable cosolvents can be used in the process at concentrations of less than 7% at which even normally flammable solvents are non-flammable in carbon dioxide working fluid.

BRIEF DESCRIPTION OF THE DRAWINGS

Other objects, features and advantages will occur to those skilled in the art from the following description of preferred embodiments and the accompanying drawings, in which.

DESCRIPTION OF THE PREFERRED EMBODIMENTS

This invention may be accomplished in methods for separating at least the polymer component of a plastic from non-polymer components by intermingling a flow of heated plastic with a working fluid such as supercritical $CO_2$. The working fluid dissolves non-polymer components such as plasticizers, UV and oxidation stabilizers, and colorants. Particulate contaminants such as glass and other particulates can be readily filtered from the $CO_2$-fluidized plastic stream. The $CO_2$ can then be easily removed from the fluidized stream by dropping the pressure and temperature. Virtually all of the polymer will remain in the bottoms of a $CO_2$-separator. Additional $CO_2$ can be separated from the bottoms in a second separation stage, resulting in the production of a purified polymer, typically including about 1% to 10% by weight plasticizer. The plasticizers and other non-polymer components dissolved in the $CO_2$ can then be separated from the $CO_2$ in a pressurized distillation column. The overhead from the distillation column can be condensed and returned as feedstock for the supercritical $CO_2$ process stream.

Figure 1:
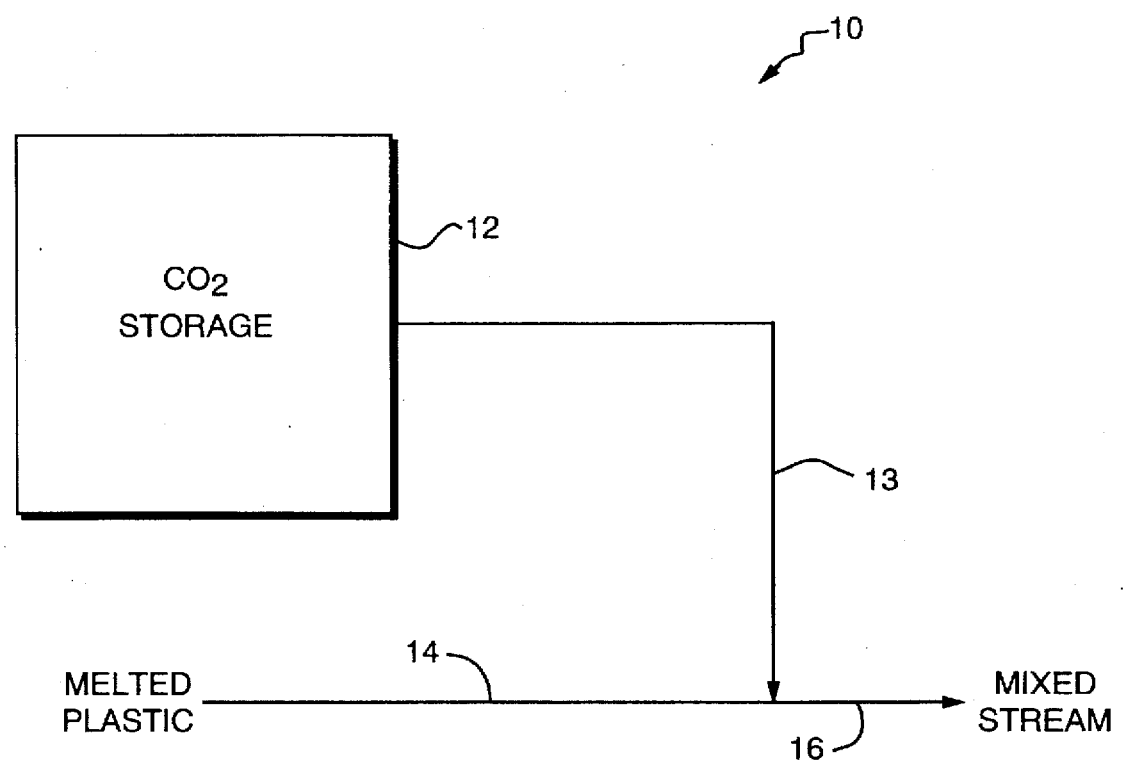
FIG. 1 is a simplified schematic diagram of a continuous polymer-separation method according to this invention.

There is shown in FIG. 1 a simplified schematic diagram of an apparatus and method according to this invention for separating a polymer from other components of a plastic. The plastic to be processed, such as PVB, PET, PVC (polyvinyl chloride, or another plastic, is melted and provided as flow 14. The flow is preferably accomplished with an extruder such as a screw-type extruder with a relatively large tolerance so that the extruder is not blinded by particulate contaminants, such as glass shards, that are present in the post-consumer plastic being recycled. Since PVB interlayer is extremely tacky, glass, dirt, and other particulates are virtually always present in post-consumer PVB interlayer. A working fluid, typically carbon dioxide in its supercritical state, is introduced into flow 14. This is accomplished by providing $CO_2$ storage 12 from which is directed supercritical stream 13 that is intermingled with stream 14 to create mixed supercritical $CO_2$-melted plastic stream 16.

The supercritical $CO_2$ dissolves non-polymer components such as plasticizers that are present in the melted plastic. The supercritical $CO_2$ also fluidizes the melted plastic so that it can be more easily filtered to remove particulates such as glass particles from the mixed stream. Without such fluidization, the pressure drop across the required fine-mesh filter (typically, filtration to at least <300 microns is required) would make filtration impractical, if not impossible. The $CO_2$ may be removed from the mixed stream by a process as simple as venting the stream to atmosphere to leave behind a purified polymer which can be used as the feedstock in a plastic-manufacturing operation. The purified polymer typically includes at about 1% to 10% by weight plasticizer. As described below, the $CO_2$ is preferably separated in a manner in which the $CO_2$ can be returned to $CO_2$ storage 12 for reuse in the process. The extracted component (s) such as the plasticizers may be recovered for reuse in a plastic-manufacturing process.

Figure 2:
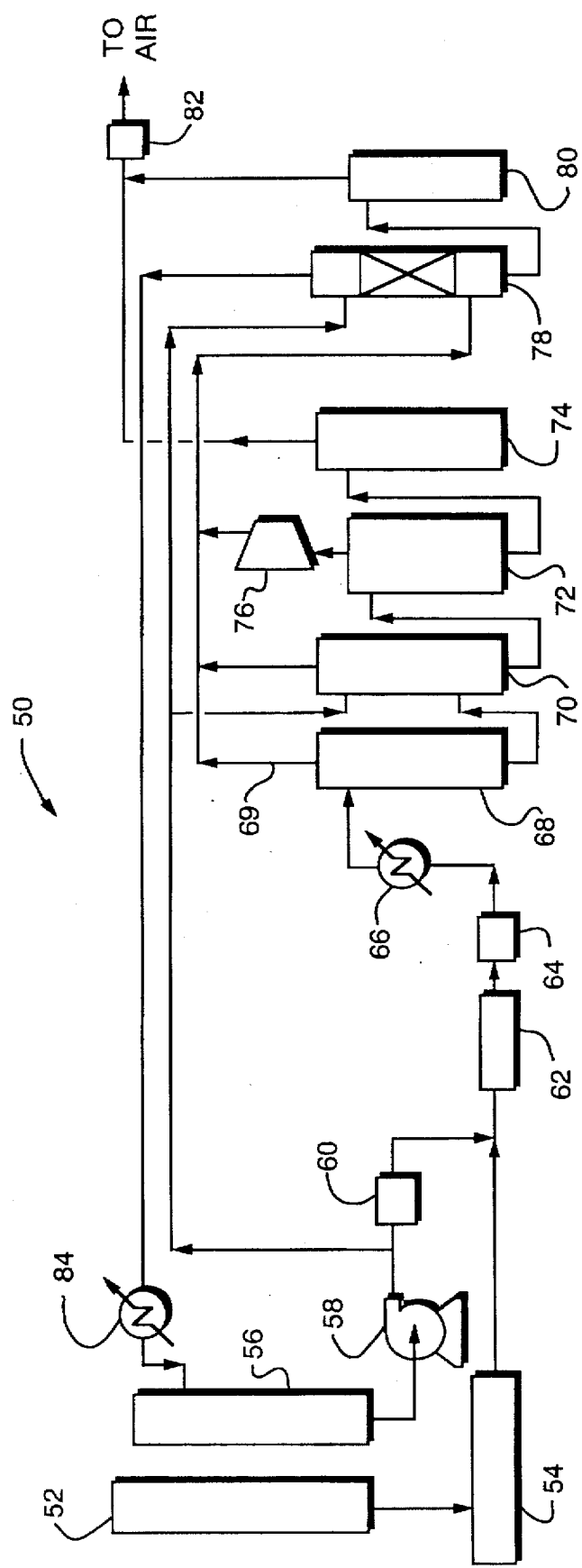
FIG. 2 is a more detailed process flow diagram for a preferred embodiment of a system for continuously separating PVB polymer from post-consumer PVB safety glass interlayer, useful for practicing the preferred embodiment of the method of this invention.

FIG. 2 depicts in greater detail a preferred embodiment of a system that can be used to practice the preferred embodiment of the method of this invention. The apparatus and process detailed in FIG. 2 will be described in relation to the recovery of PVB polymer from safety glass PVB interlayer plastic material, although that is not a limitation of this invention, as the invention may be used to separate the polymer and non-polymer components of other plastics, as long as the non-polymer components are at least partially soluble in the working fluid and/or working fluid/cosolvent mixtures which can be contacted with the post-consumer plastic.

Apparatus 50 includes storage vessel 52 for ground plastic to be processed through apparatus 50. The plastic is fed through extruder 54 which creates an output stream at approximately 200° C. and 100 bars. The $CO_2$ to be mixed with the plastic flow from extruder 54 is stored in liquid form in surge vessel 56. The pressure of the $CO_2$ liquid stream from vessel 56 is increased by pump 58, and heater 60 is used to heat the $CO_2$ stream to supercritical conditions. $CO_2$ is supercritical above 31° C. and 73.9 bar. In one embodiment, the $CO_2$ stream leaving heater 60 may comprise 12,000 kilograms per hour of $CO_2$ at 120 bars and 180° C. This is then intermingled with the flow of melted plastic from extruder 54, which may include 177 kilograms per hour of polymer, 72 kilograms per hour of plasticizer, and 1 kilogram per hour of contaminants, for a total of 250 kilograms per hour of melted plastic provided at 120 bars and 180° C. Those two streams are intermingled and passed through static mixer 62. The output stream from mixer 62 is a more fluid plastic flow. Non-polymer, non-particulate components of the plastic flow, including plasticizers, stabilizers, and colorants, for example, are at least partially dissolved in the supercritical $CO_2$.

The viscosity of this mixed stream at supercritical $CO_2$ conditions is such that the particulate contaminants such as glass shards can be easily filtered from the stream using filter 64.

The filtered stream then enters a separation section which separates the polymer component of the plastic, the non-polymer components that are dissolved in the supercritical $CO_2$, and the $CO_2$ for reuse. The separation section begins with cooler 66 which cools the stream to 60° C. The cooled stream is then passed through primary separator 68 which is preferably a settling tank and can include filtering or cycloning to facilitate particle separation. Separator 68 could also be a vessel filled with liquid $CO_2$ into which the cooled stream was sprayed to precipitate separated PVB powder. Stream 69 from separator 68 includes over 98% of the $CO_2$ and likely something more than half of the plasticizers from the plastic. This stream is used as part of the feed for solvent recovery column 78, described below.

The bottoms from separator 68 are provided as one input to polymer wash vessel 70. A second input is part of the liquid $CO_2$ stream exiting pump 58, before it is heated to supercritical conditions by heater 60. The liquid $CO_2$ is used to wash the polymer to assist in decompounding the plasticizer from the polymer. The $CO_2$ overhead from polymer wash vessel 70 is also provided to $CO_2$ stream 69. The bottoms from vessel 70 are provided to solvent recovery vessel 72 which preferably comprises a vaporizer and demister. The bottoms from vessel 72 are an almost solvent-free stream including all the polymer and approximately 20% of the plasticizer. This stream is provided to polymer product storage vessel 74. Both vessel 72 and 74 are vented. Compressor 76 is used to liquify the $CO_2$ and add it to stream 69. Vessel 74 is vented through vent clean up 82 to air. The small amount of $CO_2$ lost can be made up by including an external solvent storage tank (not shown) which feeds solvent surge drum 56.

Solvent recovery column 78 is also fed with liquid $CO_2$ exiting pump 58. Column 78 is preferably a packed-column distillation column. The overhead $CO_2$ vapor is liquified by condenser 84 and returned to $CO_2$ surge vessel 56. The bottoms, which contain approximately 80% of the plasticizer and a small amount of $CO_2$, are provided to plasticizer storage vessel 80 which is also vented to air through clean up 82.

Figure 3:
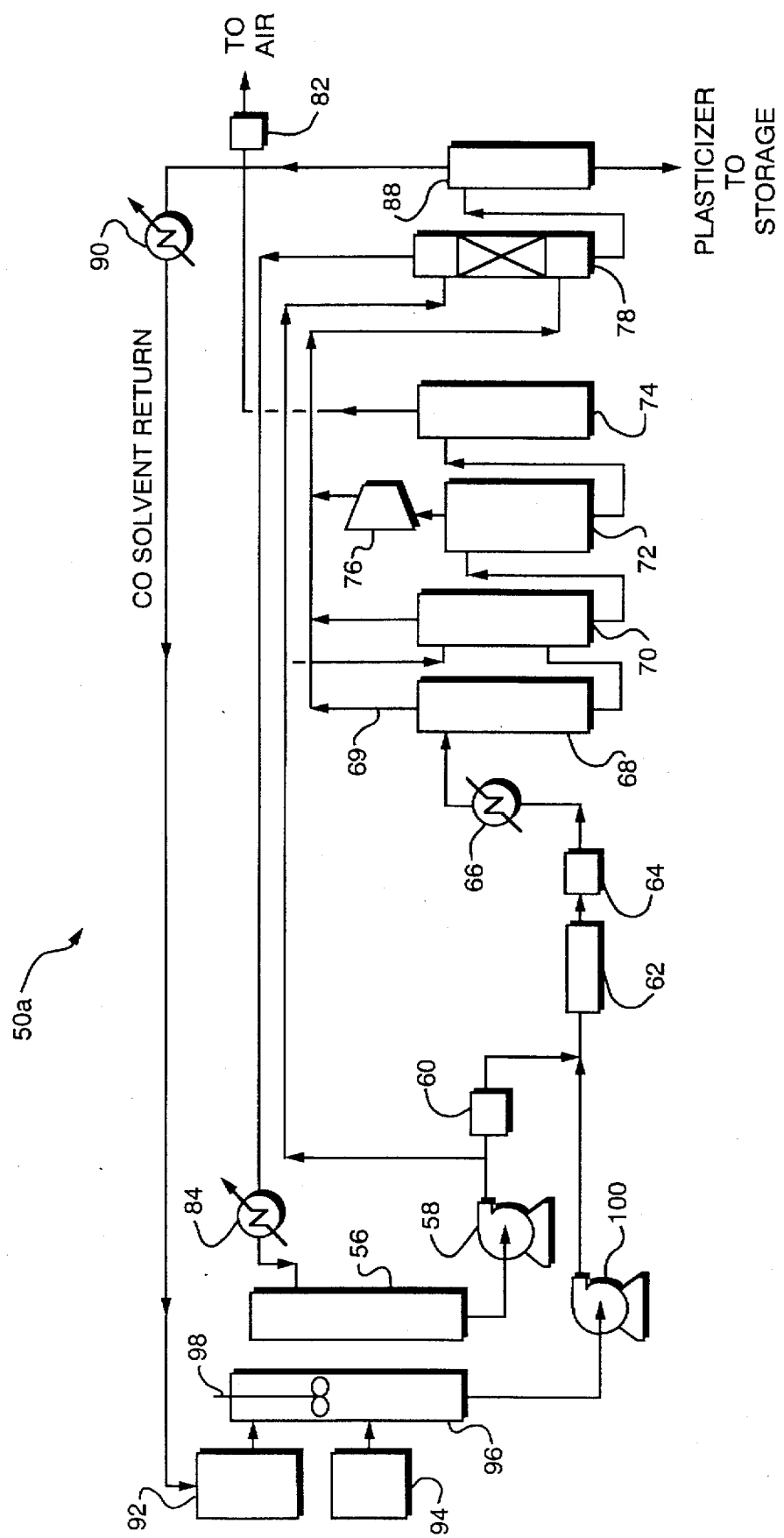
FIG. 3 is a similar process flow diagram for an embodiment in which a cosolvent is used.

FIG. 3 is a diagram of an embodiment of a system very similar to that of FIG. 2, but which is adapted to allow processing of plastics using a cosolvent along with the working fluid. The cosolvent may be one or more of the cosolvents described above. The cosolvent is a substance which at least partially dissolves the polymer component of the plastic, or one which forms a plastic slurry or emulsion along with the working fluid. The aim of the cosolvent is to decrease the viscosity of the plastic so that the particulates can be more easily filtered from the plastic, and also to promote the extraction of the plasticizers from the plastic.

Apparatus 50a differs from apparatus 50 in that it includes cosolvent storage vessel 92 and post-consumer plastic storage vessel 94, which both feed polymer/cosolvent mixing tank 96 with agitator 98 to promote the mixing. The mixture or solution of cosolvent and plastic is fed to pump 100 which is used to raise the pressure of the stream before the stream is mixed with the working fluid from storage vessel 56.

The cosolvent is carried along with stream 69 from separator 68 and is provided to solvent recovery column 78, which is used to recover the working fluid or solvent which is then returned to storage vessel 56. The bottoms from column 78 include the cosolvent and the plasticizer as described above. This stream is fed to second distillation column 88 which is used to recover the cosolvent, which is then condensed by condenser 90 and returned to cosolvent storage vessel 92. The bottoms from column 88 are provided to a plasticizer storage vessel, not shown.

The following six experimental examples illustrate the extraction of plasticizer from post-consumer PVB interlayer using supercritical $CO_2$, as the working fluid. Also illustrated is the use of two cosolvents to decrease the viscosity of the plastic so that it can be filtered with very little pressure drop.

EXAMPLE 1

A sample of the post-consumer windshield interlayer from E.I. duPont was placed in a 6 liter vessel. The sample of post-consumer duPont interlayer weighed 18 grams. The plasticizer was continuously extracted by feeding $CO_2$ near the critical point through the vessel. The temperature ranged from 28° C. to 31° C. The pressure ranged from 71 to 80 bar. Some 8450 grams of $CO_2$ were used to extract the plasticizer. The continuous extraction proceeded for 2 ½ hours. The resulting product was very different in appearance. It was stiff and not tacky. The process removed 79% by weight of the plasticizer, which initially comprised about 29% by weight of the plastic.

EXAMPLE 2

392 grams of the same duPont post-consumer interlayer was placed in the same vessel. Ethyl-aceto-acetate cosolvent weighing 396 grams was added to the vessel. Glass beads were added to mix the two solvents. Continuous extraction with $CO_2$ followed. Temperature of the experiment ranged from 40° C. to 48° C. at pressure of from 89 to 106 bars. Some 9534 grams of $CO_2$ flowed through the vessel during the 4½ hour continuous extraction. The product was removed and analyzed for residual plasticizer. In this experiment, 96% by weight of the plasticizer was removed. The product appearance was white and non-tacky.

EXAMPLE 3

A windshield originally made by Ford Motor Company was reclaimed after it was removed from a vehicle. The post-consumer plastic interlayer, originally manufactured by Monsanto Company, was recovered. A 36 gram sample of this post-consumer interlayer was processed in the same 6 liter vessel at temperatures of from 22° C. to 36° C. and pressures of 96 to 112 bar. After 3 hours of continuous extraction, using a total of 8833 grams of $CO_2$, the sample was removed. The white, stiff, non-tacky product was quite different than the original interlayer in appearance and substantially thicker. In this example, 57% by weight of the plasticizer was removed by the process.

EXAMPLE 4

Twenty grams of the same post-consumer interlayer as that used in Example 3 was placed in the 6 liter vessel. Some 570 grams of methanol cosolvent was added to the vessel. $CO_2$ was fed through the vessel continuously. The operating temperature was controlled around 45° C. and the pressure was held around 88 bar. Some 5129 grams of $CO_2$ were used during the continuous extraction which proceeded for 2 hours and fifteen minutes. Analysis of the final plastic indicated that some 89% by weight of the plasticizer was removed from the original sample. The product was different from the above samples. Some of the polymer appeared to have dissolved and then reprecipitated during the experiment as the concentration of methanol in the critical working fluid decreased.

EXAMPLE 5

The post corner interlayer used in example 3 was dissolved in methanol to a concentration of about 7.5% by weight, solids. The solution was charged to a small pressure vessel equipped with a sight glass. $CO_2$ was charged to the vessel until to the point at which precipitation was observed in the vessel. The operating pressure was about 55 bars and the temperature was ambient. The resulting slurry was then continuously fed through a 0.03 inch orifice. No plugging of the feed pipe or orifice was noted. On dismantling, the equipment was clean. No noticeable change in pressure drop was observed during the experiment, illustrating little added resistance of the methanol/polymer/$CO_2$ slurry in flowing through the restriction vis-a-vis pure $CO_2$ liquid. Thus, the slurry is readily filterable.

EXAMPLE 6

The above (example 5) solution of post-consumer PVB interlayer in methanol was placed in a small container within a larger pressure vessel. The solution was agitated with an axial flow turbine blade operating at roughly 200 rpm. The vessel was pressurized to about 55 bar and maintained at about 25° C. Liquid $CO_2$ was fed to the plastic/methanol solution through a dip pipe in the small container. After some 15 minutes of continuously feeding liquid $CO_2$, the equipment was dismantled. A fine, white, free flowing PVB powder resulted. The powder was not tacky and had much greater surface area than PVB polymer produced by conventional means as observed under a microscope.

After processing, the resulting PVB polymer product typically includes from 1% to 10% by weight plasticizer in a powder, flake or granular form. This product is capable of reuse in PVB interlayer manufacture, and is actually superior to virgin PVB polymer. Great care is taken in virgin PVB interlayer manufacturing to mix the virgin PVB powder with plasticizer before extrusion, or use a twin screw extruder for premixing the polymer and plasticizers. The polymer product of this invention, being partially plasticized, facilitates the mixing with the remainder of the plasticizers necessary in the interlayer product, thus simplifying the interlayer manufacturing process. There is not so much plasticizer in the PVB product, however, that it's glass transition temperature is close to room temperature, which would require the use of refrigerated storage and transport equipment. Thus, the partially-plasticized PVB product is also easy to ship and handle.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of purifying a polymer component of a thermoplastic which includes at least a second component other than the polymer, using a fluid which is a gas at room temperature, and which is a solvent for the second component, the method including the steps of:

mixing the thermoplastic with a cosolvent which at least partially dissolves the polymer, and that is miscible in said fluid, to decrease the viscosity of the thermoplastic;

introducing into the thermoplastic-cosolvent mixture, said fluid in the liquid, critical fluid, or supercritical fluid state, to solubilize and thus to separate the second component from the polymer, and in which said introduced fluid precipitates some of the dissolved polymer from the cosolvent; and separating the precipitated polymer from the mixture, to recover purified polymer from the thermoplastic.

2. The method of claim 1 further including the step of filtering the thermoplastic-cosolvent mixture, either before or after the introduction of said fluid, to remove particulate contaminants.

3. The method of claim 1 further including the step of further precipitating dissolved polymer from the cosolvent by contacting the thermoplastic-cosolvent-fluid mixture with said fluid in the liquid state.

4. The method of claim 3 in which the step of further precipitating dissolved polymer includes introducing the thermoplastic-cosolvent-fluid mixture into a vessel filled with said fluid in the liquid state.

5. The method of claim 1 in which the cosolvent is selected from the group of cosolvents consisting of alcohols, ketones, esters, ethers, aliphatic hydrocarbons and aromatic hydrocarbons.

6. The method of claim 1 in which said fluid is selected from the group of fluids consisting of carbon dioxide, ethane, propane, butane, ethylene, propylene, butylene, dimethyl ether, sulfur hexafluoride, nitrous oxide and halogenated hydrocarbons.

7. The method of 6 in which said fluid is carbon dioxide.

8. The method of claim 1 further including the step of separating said fluid from the mixture, after separation of the precipitated polymer from the mixture, to leave the cosolvent with dissolved second component.

9. The method of claim 8 further including the step of separating most of the dissolved second component from the cosolvent.

10. The method of claim 9 in which the step of separating most of the dissolved second component from the cosolvent is accomplished by distillation of the cosolvent with dissolved second component.

11. The method of claim 1 in which the plastic is polyvinyl butyral.

12. The method of claim 1 in which the second component is a plasticizer for the polymer.

13. A method of purifying a polymer component of a thermoplastic which includes at least a second component other than the polymer, using a fluid which is a gas at room temperature, and which is a solvent for the second component, the method including the steps of:

mixing the thermoplastic with a cosolvent which at least partially dissolves the polymer, and that is miscible in said fluid, to decrease the viscosity of the thermoplastic;

introducing into the thermoplastic-cosolvent mixture, said fluid in the liquid, critical fluid, or supercritical fluid state, to solubilize and thus to separate the second component from the polymer, and in which said introduced fluid precipitates some of the dissolved polymer from the cosolvent;

filtering the thermoplastic-cosolvent mixture, either before or after the introduction of said fluid, to remove particulate contaminants;

mixing the thermoplastic-cosolvent-fluid mixture with additional said fluid in the liquid state, to precipitate dissolved polymer from the cosolvent; and separating the precipitated polymer from the mixture, to recover purified polymer from the thermoplastic.

14. The continuous separation method of claim 1 in which said working fluid is a critical fluid.

15. The continuous separation method of claim 1 in which said working fluid is a supercritical fluid.

* * * * *